United States Patent [19]
Meaney

[11] Patent Number: 5,174,263
[45] Date of Patent: Dec. 29, 1992

[54] MOTORCYCLE ENGINE MANAGEMENT SYSTEM

[75] Inventor: John D. Meaney, Hartland, Mich.

[73] Assignee: Echlin, Inc., Branford, Conn.

[21] Appl. No.: 835,609

[22] Filed: Feb. 13, 1992

Related U.S. Application Data

[63] Continuation-in-part of Ser. No. 720,015, Jun. 24, 1991, Pat. No. 5,088,464.

[51] Int. Cl.⁵ .................. F02M 51/00; F02D 41/24
[52] U.S. Cl. ................................. 123/478; 123/417; 123/480
[58] Field of Search .............. 123/478, 480, 417, 416, 123/73 C, 43 J, 494

[56] References Cited

U.S. PATENT DOCUMENTS

| | | | |
|---|---|---|---|
| 4,947,816 | 8/1990 | Nakaniwa et al. | 123/478 |
| 4,947,820 | 8/1990 | Kushi | 123/571 |
| 4,955,348 | 9/1990 | Budde et al. | 123/478 |
| 4,962,739 | 10/1990 | Wataya | 123/435 |
| 4,967,711 | 11/1990 | Morikawa | 123/478 |
| 4,967,715 | 11/1990 | Hosaka | 123/494 |
| 4,996,958 | 3/1991 | Iwata et al. | 123/417 |
| 5,002,031 | 3/1991 | Kako | 123/486 |
| 5,003,950 | 4/1991 | Kato et al. | 123/417 |
| 5,016,595 | 5/1991 | Kawai et al. | 123/478 |
| 5,088,464 | 2/1992 | Meany | 123/478 |

Primary Examiner—Raymond A. Nelli
Attorney, Agent, or Firm—Barnes, Kisselle, Raisch, Choate, Whittemore & Hulbert

[57] ABSTRACT

A system for managing operation of a V-twin motorcycle engine that includes a throttle body having an air intake manifold adapted to be mounted to the engine over the cylinder intake ports, and a throttle for control by an operator to admit combustion air into the manifold. A pair of fuel injectors are mounted on the throttle body, and are responsive to electronic injector control signals for injecting fuel into the air intake manifold adjacent to the intake ports. A fuel pump delivers fuel under pressure from a fuel supply, and a pressure regulator is coupled to the pump for supplying fuel at regulated pressure to the injectors. An engine speed sensor is operatively coupled to the engine for supplying an electrical signal as a function of engine speed. A second sensor such as a pressure sensor is operatively coupled to the engine air intake manifold for supplying an electrical signal as a function of combustion air available in the manifold. An electronic controller includes a memory having a plurality of injector pulse width control parameters stored therein as a look-up table addressable as a function of the speed and pressure signals from the respective sensors. The injector control signals are generated as a function of such parameters obtained from the look-up table.

15 Claims, 9 Drawing Sheets

MOTORCYCLE ENGINE MANAGEMENT SYSTEM

This application is a continuation-in-part of application Ser. No. 07/720,015 filed Jun. 24, 1991, now U.S. Pat No. 5,088,464.

The present invention is directed to electronic control of internal combustion engines, and more particularly to control of fuel injection and ignition in a motorcycle engine.

BACKGROUND AND OBJECTS OF THE INVENTION

Electronic control of engine operation, particularly in automotive applications, has become more precise and sophisticated as fuel economy and environmental considerations have become more stringent. However, for a number of reasons including unique operating conditions and low volume, electronic engine control has not enjoyed significant application in connection with motorcycle engines.

It is a general object of the present invention to provide a system for managing operation of motorcycle engines, through electronic control of fuel injection and/or ignition advance angle, that improves fuel economy and reduces engine exhaust emissions, that increases power available at the engine, that improves driveability particularly at heavy load, that improves cold weather starting, and/or that may be readily adjusted by the operator or service technician to suit the particular driving conditions or operating idiosyncrasies of the motorcycle. Another and more specific object of the invention is to provide an engine management system of the described character that may be incorporated in motorcycles at the time of manufacture, and that may be marketed as a replacement package for retrofit of existing motorcycles in the after-market. A further and yet more specific object of the present invention is to provide an engine management system of the described character that finds particular utility in conjunction with Harley-Davidson V-twin motorcycle engines.

SUMMARY OF THE INVENTION

A system for managing operation of a motorcycle engine in accordance with the present invention includes a throttle body having an air intake manifold adapted to be coupled to the engine, and a throttle for control by an operator to admit combustion air into the manifold. At least one fuel injector is mounted on the throttle body, and is responsive to electronic injector control signals for injecting fuel into the air intake manifold. A fuel pump delivers fuel under pressure from a fuel supply, and a pressure regulator is coupled to the pump for supplying fuel at regulated pressure to the injector. An engine speed sensor is operatively coupled to the engine for supplying an electrical signal as a function of engine speed. A second sensor is operatively coupled to the engine for supplying an electrical signal as a function of quantity of combustion air available within engine. An electronic controller includes a memory having a plurality of injector pulse width control parameters stored therein as a look-up table addressable as a function of the speed and air-quantity signals from the respective sensors. The injector control signals are generated as a function of such parameters obtained from the look-up table.

In the preferred embodiment of the invention the sensor responsive to quantity of combustion air comprises an air intake manifold pressure sensor. However, in some engines the overlap of the cam shaft is such that there is very little change in manifold pressure during operation. In these engine applications, combustion air quantity may be inferred from the output of a throttle position sensor, or from a mass air flow sensor on the throttle body.

In the preferred embodiment of the motorcycle engine management system in accordance with the invention, the controller memory also has a plurality of ignition angle control parameters stored therein as a second look-up table addressable as a function of the engine speed and manifold absolute pressure signals, and ignition advance angle at the engine is controlled as a function of control parameters obtained from such table. A container of nitrous oxide ($N_2O$) is coupled to a solenoid valve that distributes nitrous to a nozzle mounted in the throttle body assembly. The electronic controller is responsive to engine operating parameters to activate the nitrous solenoid, and automatically to add additional fuel through the injectors and retard spark timing accordingly. Additional sensors responsive to engine operating conditions, such as a throttle position sensor, an air temperature sensor, an engine oil temperature sensor, an engine exhaust oxygen sensor and a battery voltage sensor, supply corresponding signals to the controller for preprogrammed modification of the fuel injector control signals as appropriate to obtain desired engine operation.

In a specific but presently preferred implementation of the invention for use in manufacture or after-market retrofit of Harley-Davidson V-twin motorcycle engines, the throttle body is specifically adapted and contoured to replace the carburetor on the engine. A pair of fuel injectors are mounted on the air intake manifold portion of the throttle body respectively adjacent to the cylinder intake ports of the engine. An electric-motor fuel pump replaces the gravity-feed fuel supply configuration on the motorcycle for supplying fuel at elevated regulated pressure to the fuel injectors. The engine speed sensor is responsive to rotation of the engine cam shaft for supplying a signal pulse at a predetermined angle prior to top-dead-center at each of the engine cylinders. Both fuel injectors are activated in response to each such engine speed pulse for a time duration determined by the fuel injection control parameters obtained from the look-up table, as modified where appropriate as a function of the signals obtained from the various supplemental engine condition sensors.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

U.S application Ser. No. 07/429,789, filed Oct. 26, 1989 and assigned to the assignee hereof, discloses a engine fuel delivery control system that includes an engine having at least one fuel injector responsive to electronic control signals for delivering fuel to the engine cylinders, and a plurality of sensors for supplying electrical sensor signals as various functions of engine operating conditions. An electronic engine control unit includes an electronic memory storing engine control parameters in a variety of look-up tables, a microprocessor-based controller for periodically addressing the memory tables and obtaining required control parameters as a function of sensor signal inputs, and circuitry for supplying control signals to the injectors as a predetermined function of the control parameters obtained from the look-up tables. Apparatus for selectively varying the control parameters in the look-up tables includes facility for up-loading selected tables from the engine control unit memory, monitoring engine operation as reflected by addressing of the parameter tables in real time, and selectively initiating a programming mode of operation. In such programming mode of operation, addressing of the control tables is inhibited in the electronic control unit, and the control parameters obtained from the tables immediately prior to onset of the programming mode of operation are employed to supply control signals to the injectors during the programming mode of operation. In this way, engine operation continues uninterrupted during the programming mode of operation. The disclosure of such U.S. application is incorporated herein by reference.

Figure 1:
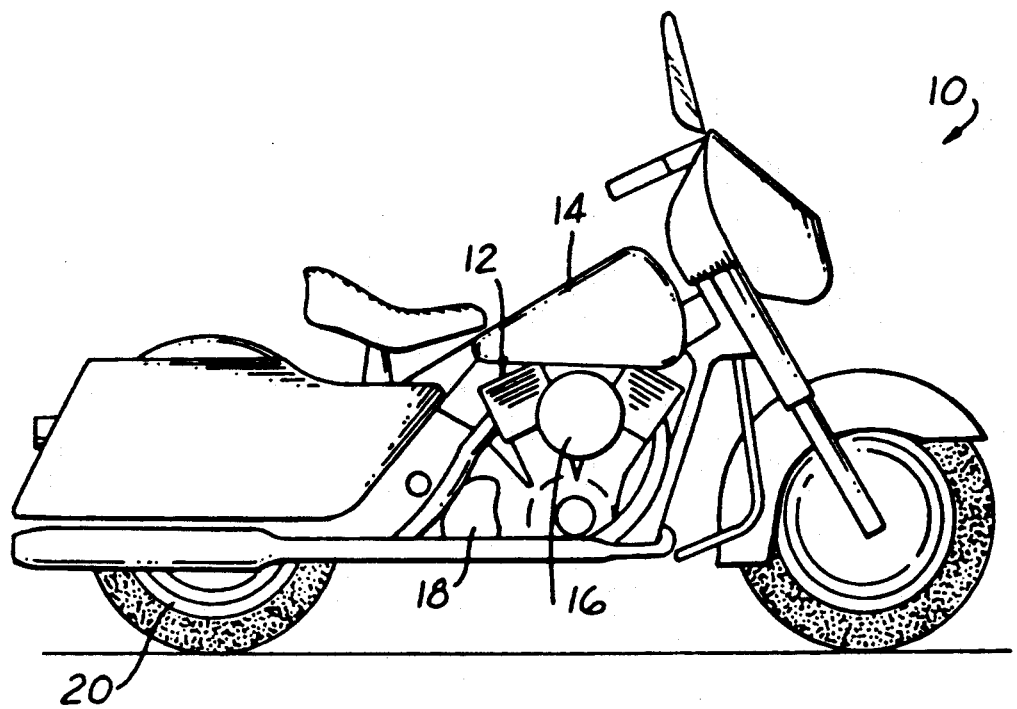
FIG. 1 is a schematic illustration in side elevation of a motorcycle having an engine controlled by a management system in accordance with the present invention.
Figure 2:
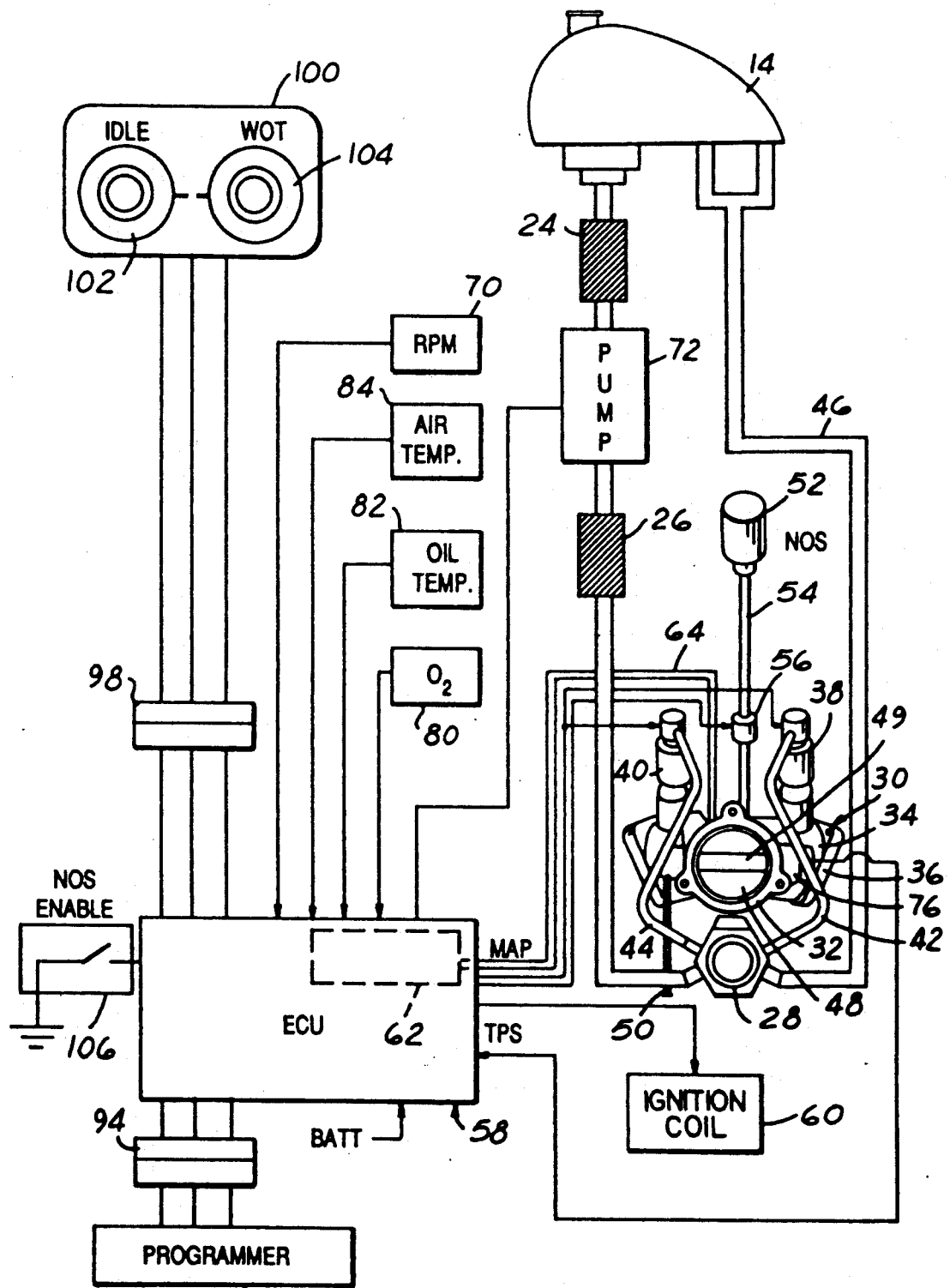
FIG. 2 is a functional block diagram of a motorcycle engine management system in accordance with a presently preferred embodiment of the invention.
Figure 8:
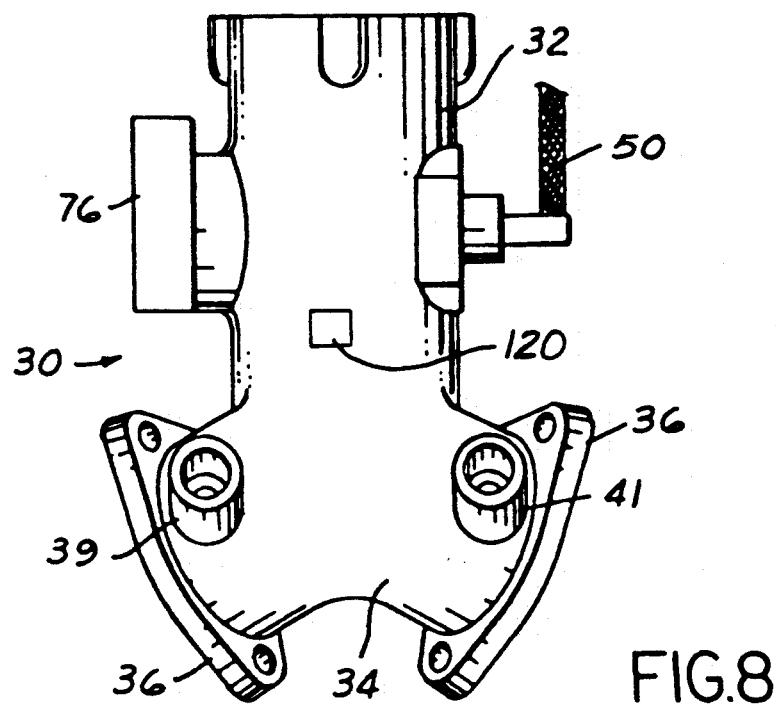
Figure 9:
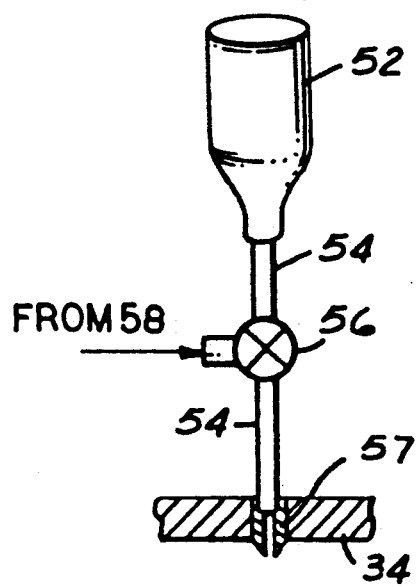

FIG. 1 illustrates a motorcycle 10 having a V-twin internal combustion engine 12 with a pair of cylinders that receive fuel from a tank 14 and combustion air through an air filter 16. Motive power is supplied by engine 12 through a transmission 18 to the rear or drive wheel 20. Referring to FIG. 2, fuel from tank 14 is supplied by an electric-motor fuel pump 22 through a pair of filters 24,26 to a pressure regulator 28 mounted on the sidewall of a throttle body assembly 30 (FIGS. 1 and 8). The throttle body 32 and intake manifold 34 are integrated into one assembly 30. Manifold 34 has mounting flanges 36 for mounting on engine 12 (FIG. 1) over the intake ports of the engine cylinders. A pair of electronic fuel injectors 38,40 are mounted on respective manifold bosses 39,41 (FIG. 8) of throttle body 30 at positions to be disposed adjacent to the respective cylinder intake ports. Each injector 38,40 receives fuel under pressure from regulator 28 through the corresponding fuel line 42,44, and excess fuel from regulator 28 is returned to tank 14 through the return line 46. Thus, pump 22 is operated to supply excess fuel to regulator 28 for distribution under pressure to injectors 38,40, and excess fuel is returned to tank 14.

A throttle blade 48 is mounted on a throttle shaft 49, and is coupled by a cable 50 to a suitable operator throttle control (not shown) for operator control of throttle position, and therefore regulates intake air quantity. A container 52 of nitrous oxide (N₂O) under pressure is mounted (by means not shown) on motorcycle 10. Container 52 is connected by a line 54 and a solenoid valve 56 to a discharge nozzle 57 mounted in throttle body/intake manifold assembly 30. Nozzle 57 has an orifice of diameter selected for desired increase in available horsepower upon activation of the valve. For example, an orifice size of 0.010 inches roughly equates with an increase in available horsepower of about 20 horsepower.

Figure 6:
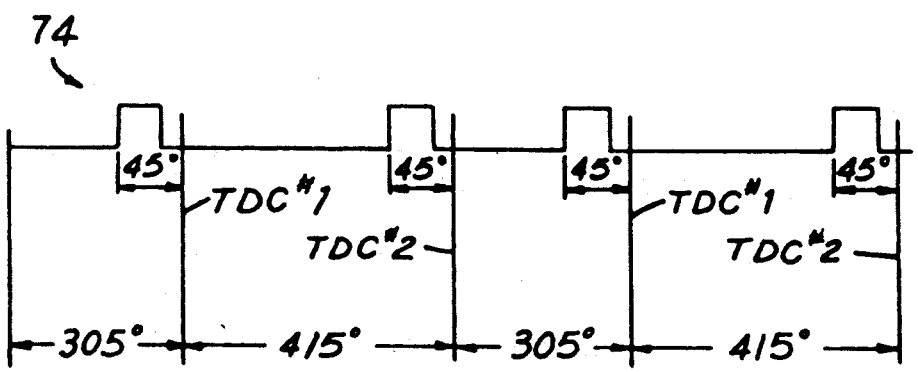
FIG. 6 is a timing diagram that illustrates the signal provided by the rpm sensor illustrated functionally in FIG. 2.
Figure 3:
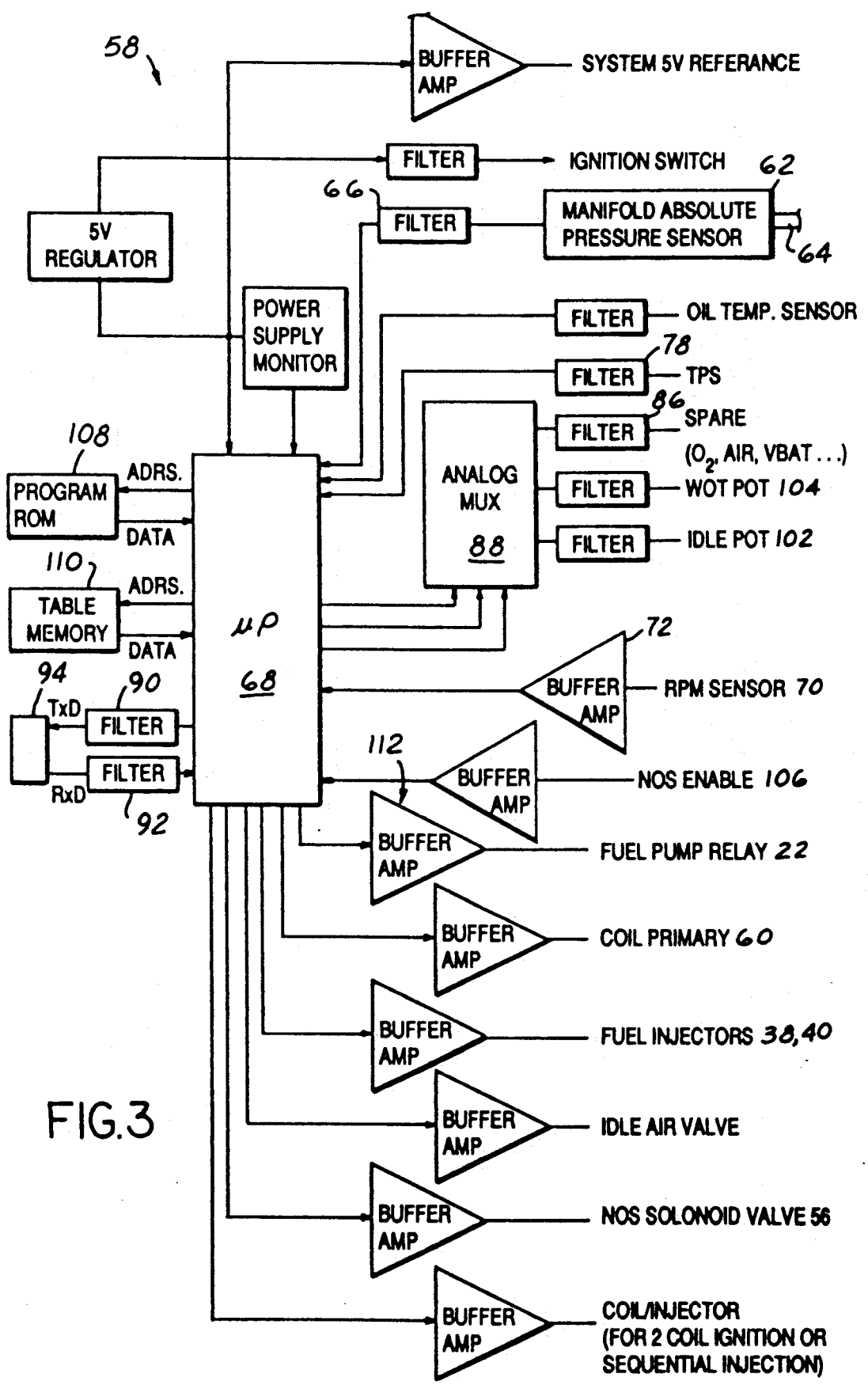
FIG. 3 is a functional block diagram of the engine control unit (ECU) illustrated in FIG. 2.

Referring to both FIGS. 2 and 3, an engine control unit or ECU 58 receives input signals from various sensors indicative of engine operating conditions, and supplies corresponding control signals for controlling engine operation to fuel injectors 38,40, solenoid valve 56, and to the ignition coil 60 of the engine ignition system. More specifically, a manifold absolute pressure sensor 62 within ECU 58 is connected to manifold 34 by a suitable hose 64, and provides an electronic signal indicative of manifold absolute pressure through a filter 66 to a control microprocessor 68. Likewise, an rpm sensor 70 feeds a signal indicative of engine speed through an amplifier 72 to an input port of microprocessor 68. In a presently preferred implementation of the invention for use in conjunction with a Harley-Davidson V-twin motorcycle engine, rpm sensor 70 comprises a hall-effect sensor responsive to operation of the engine cam shaft for providing the pulsed signal 74 illustrated in FIG. 6, consisting of a series of pulses each at a predetermined angle of 45° before top-dead-center or TDC position of a piston within its associated cylinder. (It should be noted that the characteristic asymmetric timing of Harley-Davidson engines illustrated in FIG. 6 is by way of example only, and in no way affects or limits operation of the present invention). A throttle position sensor 76 is mounted on throttle body 30, and provides an electrical signal TPS to ECU microprocessor 68 through a filter network 78 as a function of position of throttle blade 32 within the throttle body.

Preferably, but optionally, the engine management system of the present invention also includes at least one oxygen sensor 80 positioned in the engine exhaust path for sensing excess or insufficient oxygen in the exhaust, and providing a signal to ECU to control air/fuel ratio to a desired level. An oil temperature sensor 82 is positioned in the engine oil sump, and provides a signal to ECU 58 indicative of oil temperature and therefore indicative of engine operating temperature. Most preferably, for a motorcycle having duel exhausts, a pair of oxygen sensors 80 are provided, one in each of the exhaust paths. A second temperature sensor 84 is carried by the motorcycle at a position suitable for supplying a signal to ECU 58 indicative of intake air temperature to the engine manifold. Sensors 80,82 and/or 84 are connected through appropriate filtering circuitry 86 and an analog multiplexer 88 to an input port of microprocessor 68.

Serial I/O ports of microprocessor 68 are coupled through appropriate filtering networks 90,92 (FIG. 3) to a connector 94 (FIGS. 2 and 3) for selective connection to an external programmer 96, which preferably is of the type disclosed in the above-referenced co-pending application. ECU 58 also has input ports coupled to a connector 98 for selective connection to a controller 100 for programming of idle and/or wide-open-throttle modifications to the basic fuel injection control parameters stored in ECU 58. Specifically, a pair of variable resistors 102,104 with associated dials are provided on controller 100 for operator selection of fuel injection modification during idle and wide-open-throttle operation respectively. ECU 58 receives an input from an NOS enable switch 106 for operator enablement of injection of N$_2$O from container 52 into the engine throttle body manifold assembly. ECU 58 also receives an input from the motorcycle battery for adjusting injector operating time as a function of battery voltage so as to obtain desired injector actuation time independent of battery voltage.

Microprocessor 68 (FIG. 3) is connected by suitable address and data buses to a ROM 108 having operating programs, communications programs and other programs for operation of ECU 58 prestored therein. Microprocessor 68 is also connected by address and data buses to a memory 110 having engine operating control parameters prestored therein in the form of look-up tables as described hereinafter, and in greater detail in the above-referenced co-pending application. Memory 110 preferably takes the form of an EEPROM. Control outputs are individually fed from microprocessor 68 through a network of amplifiers 112 to the relay associated with fuel pump 22 (FIG. 2), to the primary winding of ignition coil 60, to the solenoids of fuel injectors 38,40, and to the solenoid of NOS valve 56. Microprocessor 68 also provides a control output to an idle air valve for bypassing air around throttle blade 48 to provide a fast idle when the engine is cold. A spare control output may be used in conjunction with an ignition coil primary in a two-coil ignition system, or one or more injectors in a separately-controlled multiple injector system. As shown in FIG. 3, ECU 58 receives power from the motorcycle ignition switch (not shown).

In general, operation of injectors 38,40 and ignition coil 60 is controlled by ECU 58 by monitoring the various engine condition sensors and accessing control parameter look-up tables stored in memory 110. Specific control algorithms for control of fuel injector timing as a function of one or more sensor outputs do not per se form part of the present invention. The above-referenced copending application discloses some exemplary control algorithms, and others are known or can be determined by persons skilled in the art depending upon desired pressure of control and/or the types of available engine sensors. However, exemplary control considerations are discussed hereinafter for the purpose of illustrating operation of the present invention.

Figure 4:
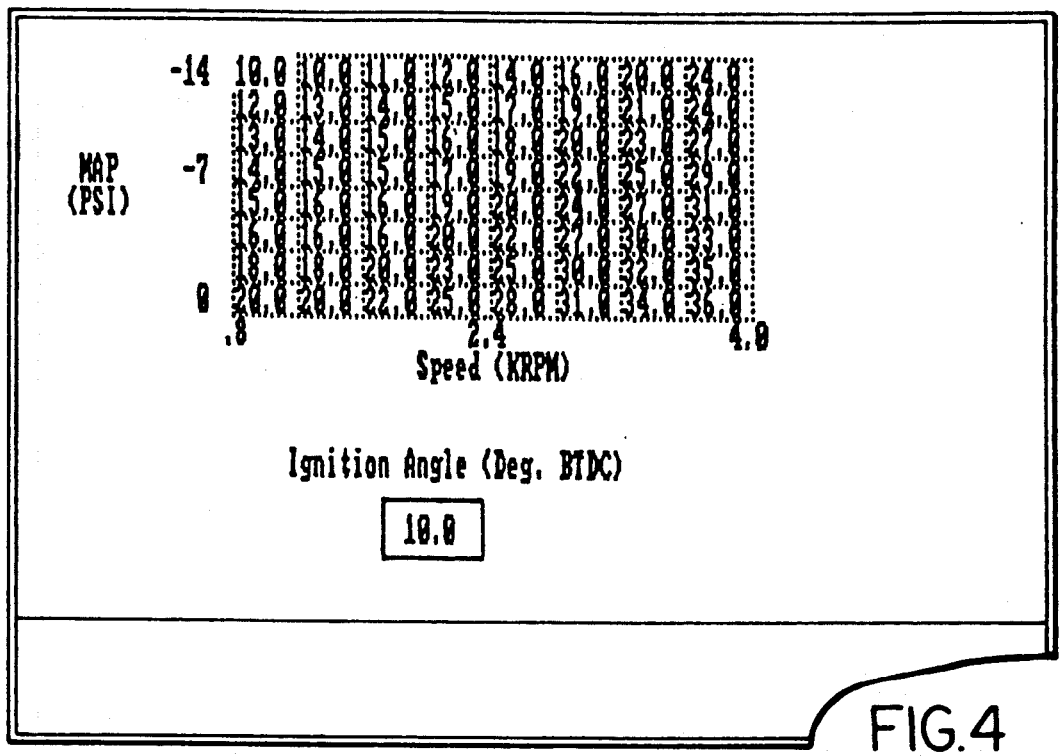
FIGS. 4 and 5 illustrate exemplary ignition advance angle and fuel injection control maps stored in the table memory of FIG. 3.
Figure 5:
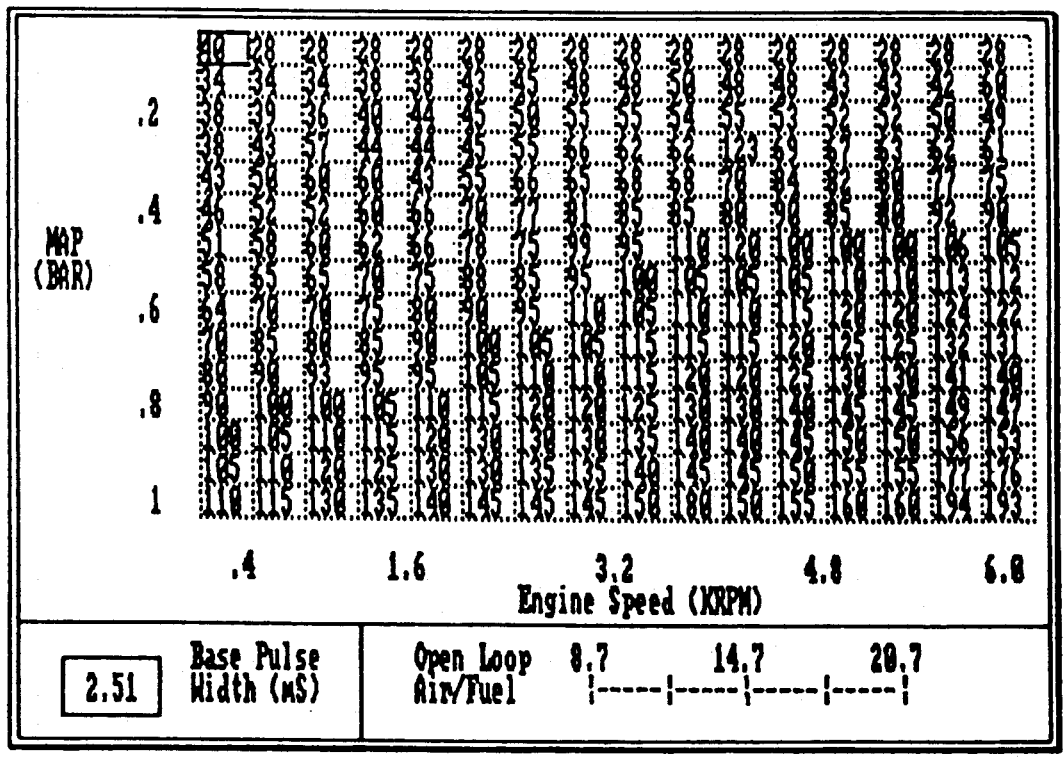

FIG. 5 illustrates a look-up table or map for a base fuel injector pulse width, and FIG. 4 illustrates a look-up table or map of engine advance angle, both as a function of engine speed determined from rpm 70 (FIG. 2) and manifold absolute pressure determined by sensor 62. As explained in greater detail in the co-pending application referenced above, a base fuel injector pulse width is obtained by access to the table of FIG. 5, and is then modified as a function of the supplemental engine condition sensor signals through parameters or factors that themselves are stored in suitable look-up tables in memory 110. For example, FIG. 5 indicates that a basic pulse width of 2.51 ms is appropriate at whatever engine speed and manifold air pressure are extant at that time. This basic pulse width may then be multiplied by factors that vary as a function of air temperature (sensor 84), engine oil temperature (82), air/fuel ratio (80) and wide open throttle (104), plus an engine idle pulse width factor determined by potentiometer 102 and an acceleration enrichment factor that may come into play when ECU 58 senses an acceleration demand at throttle sensor 76. The total pulse width is then employed to activate both injectors 38,40. In the same way, the outputs of the speed and manifold absolute pressure sensors are employed to access the engine ignition advance angle table illustrated in FIG. 4 to determine advance angle as a function of engine operating conditions. In the example of FIG. 4, an ignition advance angle of ten degrees is indicated for the engine operating conditions then extant.

Figure 7A:
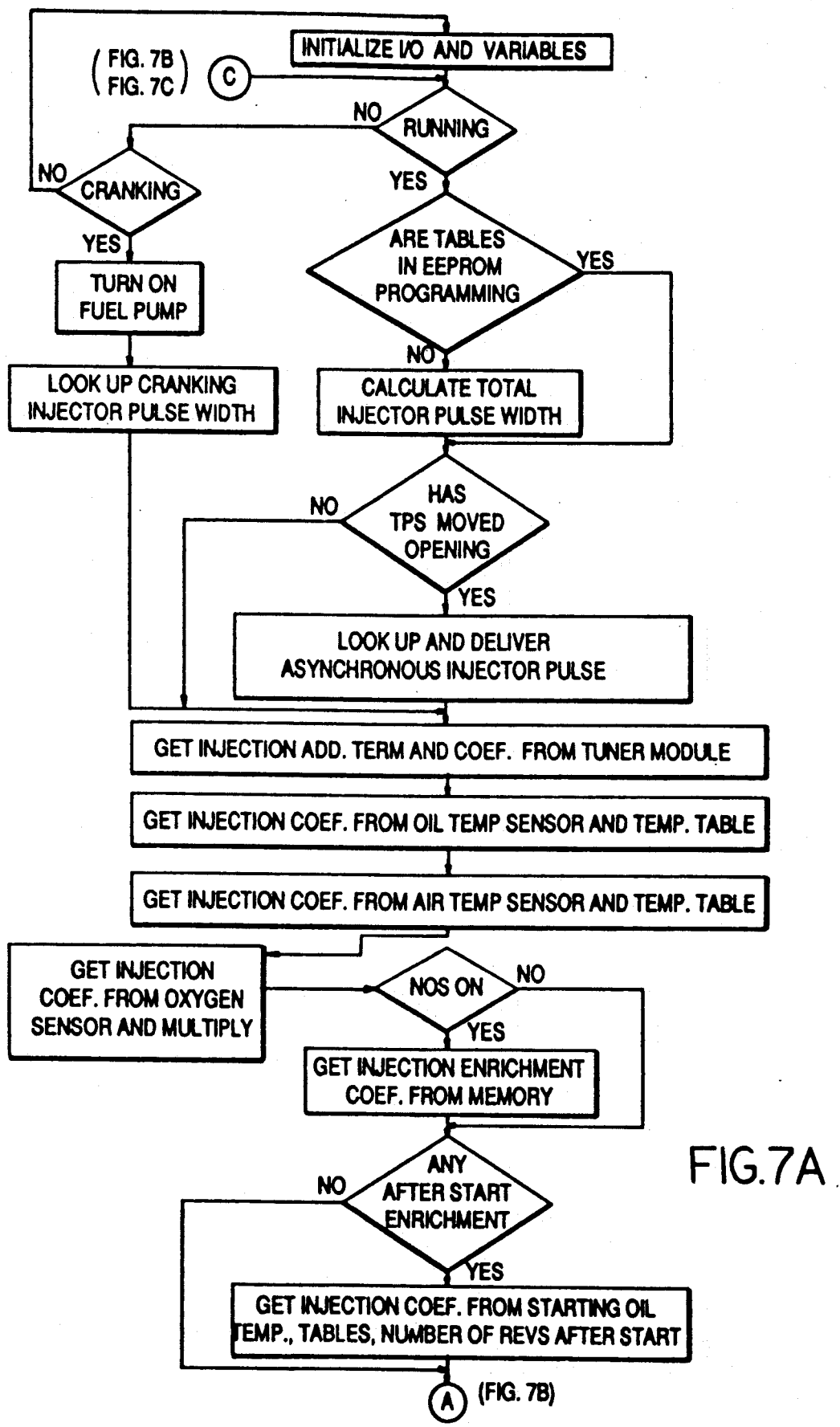
FIGS. 7A–7D together comprise a flow chart that illustrates operation of the engine ECU in FIGS. 2 and 3.
Figure 7B:
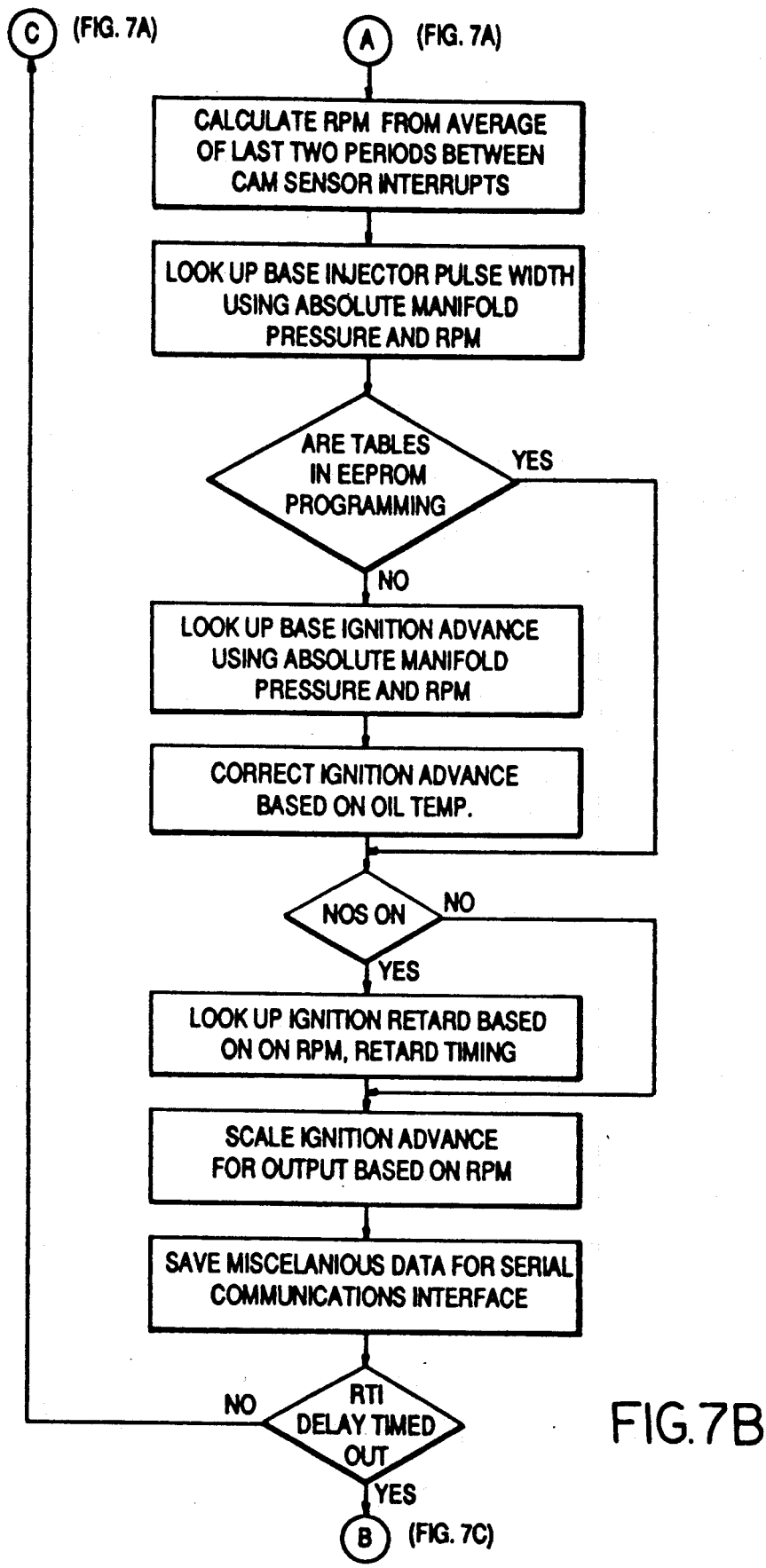
Figure 7C:
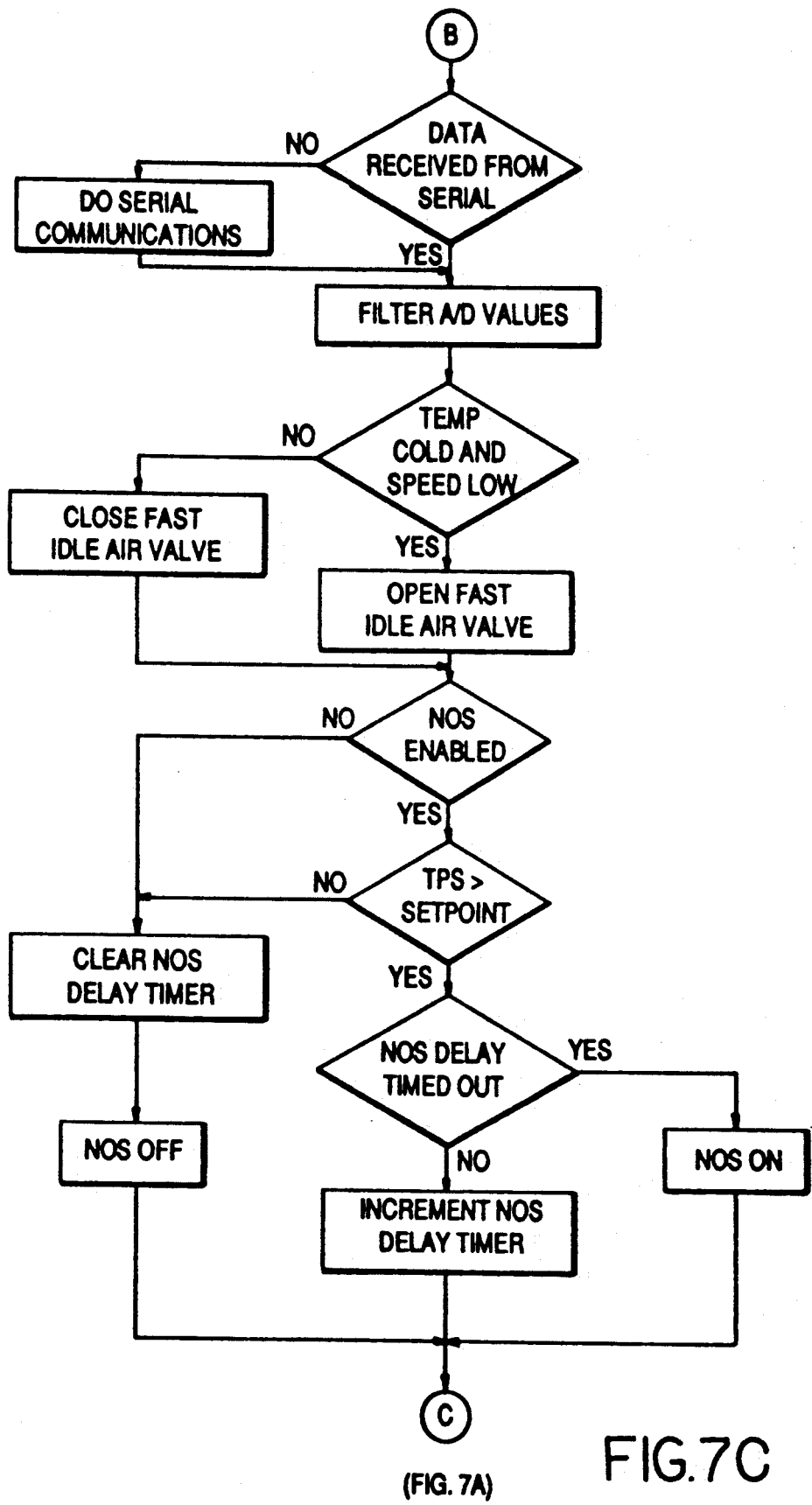
Figure 7D:
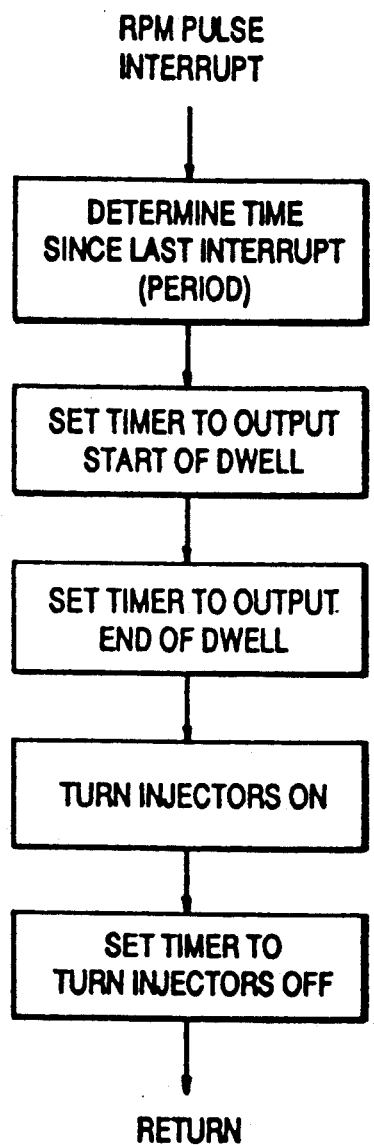

FIGS. 7A-7C illustrate the main operating routine of ECU microprocessor 68, and FIG. 7D illustrates operation of the interrupt routine that occurs at the leading edge of each rpm pulse (FIG. 6). Referring to FIG. 7A, all I/O variables are first set at initialization values when power is first applied to turn on the engine. If the operator is cranking the engine, injector pulse width and engine advance angle times are obtained from suitable tables, as discussed in the referenced co-pending application. If the engine is already running, a determination is made whether EEPROM 110 (FIG. 3) is being programmed by programmer 96 (FIG. 2), again as described in detail in the referenced co-pending application. If such programming is taking place, existing values of the various control parameters are employed. Otherwise, injector pulse width is calculated based upon previously obtained data. Tables are then accessed to obtain pulse width modification factors associated with the temperature sensors and other supplemental sensors for use in the next injector pulse width calculation. The routine then tests to see if the NOS enable switch 106 (FIG. 2) has been activated by the operator and, if so, an enrichment coefficient is obtained from its suitable table in memory, again as a function of operating conditions.

Referring to FIG. 7B, average engine rpm is calculated based upon the last two rpm pulse periods (FIG. 6), and the base injector pulse width (FIG. 5) is obtained. If the tables of EEPROM 110 (FIG. 3) are not being reprogrammed, the base ignition advance angle (FIG. 4) is next obtained. The ignition advance angle may be modified based upon engine oil temperature (sensor 82), and based upon selection of NOS enrichment since advance angle should not be advanced too far while fuel is being enriched by N$_2$O. Thus, when nitrous enrichment is selected, ignition advance is automatically retarded from the base value illustrated in FIG. 4 to a value based upon engine rpm and a preprogrammed nitrous spark retard value. Total ignition advance angle is then the summation of the base and correction values. Data is then saved for serial communication with programmer 96 (FIG. 2). Finally in FIG. 7B, a test is made to determine whether microprocessor I/O with programmer 96 (FIG. 2) should take place. Such I/O is performed at regular periodic intervals. If I/O should take place, operation branches to FIG. 7C; otherwise, operation returns to FIG. 7A.

In FIG. 7C, microprocessor 68 (FIG. 3) first performs serial communication through connector 94 with programmer 96 (FIG. 2), if appropriate. All sensor inputs are then sampled and stored, and the idle air valve is opened if the engine is cold. If nitrous enrichment has been enabled, the values of the throttle position and delay times are sampled. Once these conditions are satisfied, the nitrous enrichment function is allowed. For example, nitrous enrichment, if enabled by the operator, may be preprogrammed to take place whenever the engine speed exceeds 2500 rpm and the output of throttle position sensor 76 indicates at least a half-open throttle. NOS valve activation time may be either preset and constant, or may be variably determined by tables stored in memory 110 (FIG. 3) as a function of engine operating conditions.

FIG. 7D illustrates the interrupt routine that takes place upon occurrence of the leading edge of each rpm pulse (FIG. 6). Both injectors are turned on or opened at the leading edge of each rpm pulse. An injector timer (within microprocessor 68) is then set to the total injector pulse width previously calculated per FIG. 7A. When this time times out, the injector activator signal is terminated, and both injectors are allowed to close. Another timer is set based upon desired ignition advance from the leading edge of each rpm pulse (FIG. 6). When this timer times out, microprocessor 68 interrupts the current to the primary of ignition coil 60 to deliver spark energy to both cylinders (double fire) simultaneously. Operation returns to the point from which operation branched upon occurrence of the rpm pulse interrupt.

As previously noted, for enhanced fuel economy and reduced emissions, the engine management system of the present invention preferably includes one or more oxygen sensors 80 (FIG. 2), and facility responsive thereto for maintaining air fuel ratio of the stoichiometric value of 14.7. For dual exhaust motorcycle engines, two sensors 80 may be provided, one in each exhaust path. Where both injectors are controlled simultaneously, the oxygen sensor outputs may be polled and averaged. More preferably, the ECU samples both sensor outputs and selects the richer output for control purposes, so that correction is always on the lean side. Where the injectors are controlled separately, each oxygen sensor may be sampled to control its corresponding injector. Alternatively, one oxygen sensor 80 may be mounted in one of the exhaust parts, and its output treated as indicative for both cylinders.

In any event, as previously discussed and as illustrated in FIG. 7A, an oxygen sensor output is obtained. When such output indicates a rich air/fuel mixture, the base injector pulse width is multiplied by a correction factor less than one to reduce the pulse width. On the other hand, if the oxygen sensor or sensors indicate a lean mixture, the base pulse width is multiplied by a correction factor greater than one. The pulse width value so corrected (and with other corrections as appropriate) is then loaded into the injector pulse width timer. Lean or rich pulse width correction factors may be constant, or may be variable and stored in associated maps as a function of sensor(s) output.

There has thus been provided in accordance with the present invention a management system for motorcycle engines that fully satisfies all of the objects and aims previously set forth. For example, it has been found that a Harley-Davidson V-twin motorcycle, in which the present invention has been replaced by retrofit for the fuel delivery and ignition system provided by the original equipment manufacture, achieved an increase of available horsepower of 15% between 5,000 and 6,000 rpm. The operating parameters and programming may be readily adjusted or readjusted using programmer 96 (FIG. 2) as described in the referenced co-pending application. Variable fuel ignition control and ignition advance timing improve driveability by reducing or eliminating engine sputter that can occur at low speeds under heavy load. Fuel economy is increased and exhaust emissions are reduced, particularly when closed loop control is implemented in conjunction with oxygen sensor 80. In addition, improved cold weather starting is obtained when fuel injection is controlled as a function of ambient temperature.

It has been found that some motorcycle engines have a cam shaft overlap that produces very little change in manifold air pressure over the full range of engine operating conditions. Pressure sensors would not be sufficiently sensitive to such small changes in pressure. In such engines, it is preferably to map fuel injection pulse width as a function of some other parameter indicative of quantity of air available for combustion at the engine, such as position of throttle blade 48 from which air quantity can be inferred. Thus, the output of TPS 76 is employed in such applications for mapping and retrieving fuel injection pulse widths for the injector map. Alternatively, a conventional mass air flow sensor 120 (FIG. 8) may be mounted on throttle body 32 for providing a signal indicative of air flow to the engine cylinders.

I claim:

1. A system for managing operation of a motorcycle engine that comprises:
   a throttle body having an air intake manifold coupled to said motorcycle engine and a throttle adapted for control by an operator for controlled admission of combustion air to said manifold,
   at least one fuel injector mounted on said throttle body and responsive to electronic injector control signals for injecting fuel into said manifold,
   a fuel pump for delivering fuel under pressure from a fuel supply and pressure regulating means coupled to said pump for supplying fuel at regulated pressure to said injector,
   an engine speed sensor operatively coupled to said engine for supplying a first electrical signal as a function of engine speed,
   a sensor operatively coupled to said manifold for supplying a second electrical signal as a function of combustion air available in said manifold, and
   electronic control means including an electronic memory having a plurality of injector pulse width control parameters stored therein as a look-up table addressable as a function of said first and second signals, and means for generating said injector control signals as a function of said parameters.

2. The system set forth in claim 1 wherein said memory has a plurality of ignition angle control parameters stored therein as a second look-up table addressable as a function of said first and second signals, and wherein said system further comprises means for controlling ignition angle at said engine as a function of said control parameters in said second table.

3. The system set forth in claim 1 further comprising a source of fuel enrichment, and a valve mounted on said throttle body coupled to said fuel enrichment source and responsive to electronic valve control signals for delivering fuel enrichment from said source to said manifold, and wherein said electronic control means comprises means responsive to one or both of said sensor signals for providing said valve control signal and thereby delivering fuel enrichment to said engine.

4. The system set forth in claim 3 wherein said source of fuel enrichment comprises a container of $N_2O$ under pressure.

5. The system set forth in claim 3 wherein said control means further comprises means for automatically modifying said injector control signals to increase fuel injection at the engine when fuel enrichment is delivered to said manifold.

6. The system set forth in claim 1 comprising a throttle position sensor coupled to said throttle for supplying an electrical throttle position signal as a function of position of said throttle, and wherein said means for generating said injector control signals including means for modifying said injector control signals as a function of said throttle position sensor signals.

7. The system set forth in claim 6 further comprising means coupled to said signal-modifying means and responsive to an operator for controlling modification of said injector control signals as a function of said throttle position signals.

8. The system set forth in claim 1 further comprising means responsive to an operator for selectively modifying said injector control signals at idle speeds of said engine.

9. The system set forth in claim 1 further comprising a source of electrical power, and wherein said electronic control means includes means responsive to voltage level at said source of electrical power for modifying said injector control signals to obtain desired fuel injection time independent of voltage level at said power source.

10. The system set forth in claim 1 further comprising an oxygen sensor responsive to engine exhaust for generating an oxygen sensor signal as a function of oxygen concentration in said exhaust, and wherein said electronic control means comprises means responsive to said oxygen sensor signal for modifying said injector control signals to obtain a desired air/fuel ratio at said engine.

11. The system set forth in claim 1 further comprising a temperature sensor responsive to operating temperature of said engine for generating an engine temperature signal, and wherein said electronic control means includes means responsive to said engine temperature signal for modifying said injector control signals.

12. The system set forth in claim 1 further comprising a temperature sensor responsive to air temperature supplied to said manifold for generating a temperature sensor signal, and wherein said electronic control means includes means for modifying said injector control signals as a function of said temperature sensor signals.

13. The system set forth in claim 1 wherein said sensor for providing said second signal as a function of combustion air available in said manifold comprises a pressure sensor for supplying said second signal as a function of manifold air pressure.

14. The system set forth in claim 1 wherein said sensor for providing said second signal as a function of combustion air available in said manifold comprises a throttle position sensor coupled to said throttle for supplying said second signal as a function of position of said throttle.

15. The system set forth in claim 1 wherein said sensor for providing said second sensor signal as a function of combustion air available in said manifold comprises a mass air flow sensor mounted on said manifold for providing said second signal as a function of mass air flow through said manifold.

* * * * *